United States Patent [19]

Hardy

[11] Patent Number: 5,111,356
[45] Date of Patent: May 5, 1992

[54] COMPOSITE STRUCTURE RESISTANT TO THERMAL SHOCKS AND APPLICATION THEREOF TO MULTIPLE-LAYER CERAMIC CAPACITORS

[75] Inventor: Patrick Hardy, Auxonne, France

[73] Assignee: Compagnie Europeenne de Composants Electroniques LCC, Courbevoie, France

[21] Appl. No.: 593,766

[22] Filed: Oct. 5, 1990

[30] Foreign Application Priority Data

Oct. 9, 1989 [FR] France ................... 89 13142

[51] Int. Cl.⁵ ................... C23B 5/50; H01L 41/08
[52] U.S. Cl. ................... 361/321; 310/358
[58] Field of Search ................... 361/321, 328–330, 361/311–313; 29/25.42; 310/358

[56] References Cited

U.S. PATENT DOCUMENTS

| | | | |
|---|---|---|---|
| 2,589,831 | 3/1952 | Liechti | 361/275 |
| 3,549,415 | 7/1968 | Capek et al. | 361/321 |
| 4,516,186 | 5/1985 | Hardy | 361/306 |
| 4,649,313 | 3/1987 | Ogawa et al. | 310/358 |
| 4,663,694 | 5/1987 | Sakamoto | 361/305 |
| 4,918,570 | 4/1990 | Okamura et al. | 361/321 |

FOREIGN PATENT DOCUMENTS 3150047 7/1982 Fed. Rep. of Germany .
2528618 4/1985 France .

Primary Examiner—Donald A. Griffin
Attorney, Agent, or Firm—Roland Plottel

[57] ABSTRACT

Disclosed is a multilayer type composite structure that withstands shocks and is formed by an alternation of layers made of a first material and a second material, the first material having a higher coefficient of thermal diffusivity than the second material. The distribution of the layers and their thickness are such that, in the thickness of the structure, there are zones formed by an alternation of layers of the first material and of the second material, these zones being separated from one another by a thick layer made of the second material.

7 Claims, 1 Drawing Sheet

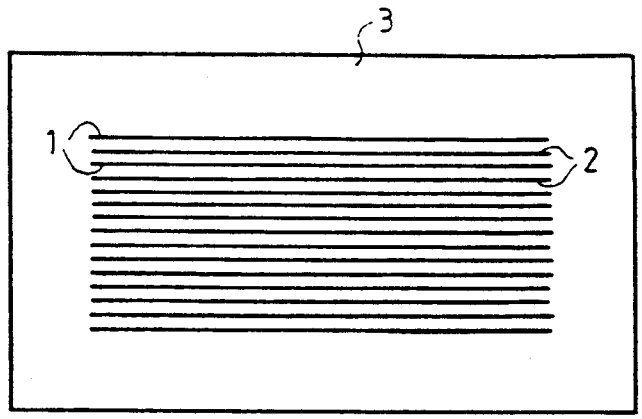
FIG_1
PRIOR ART
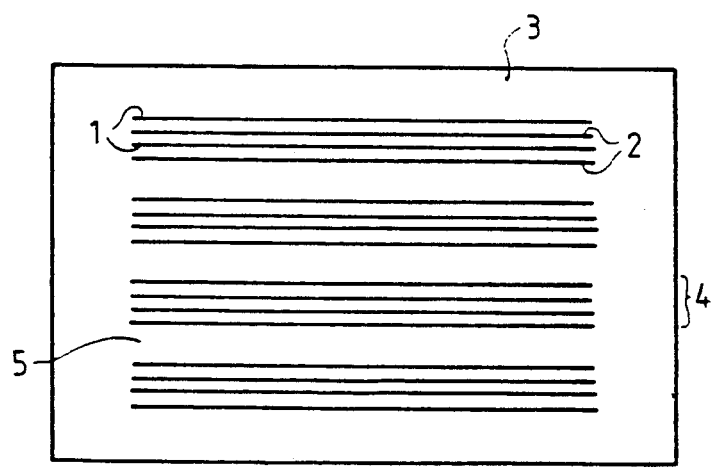
FIG_2
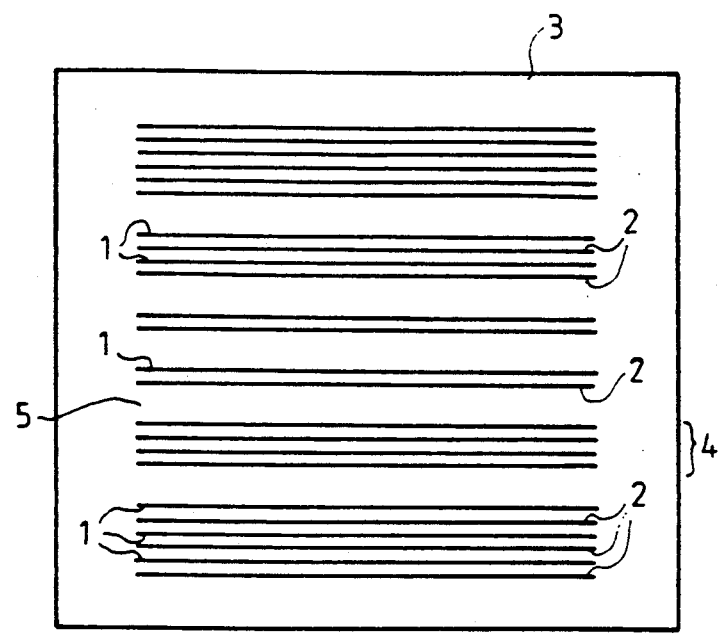
FIG_3

COMPOSITE STRUCTURE RESISTANT TO THERMAL SHOCKS AND APPLICATION THEREOF TO MULTIPLE-LAYER CERAMIC CAPACITORS

BACKGROUND OF THE INVENTION

Field of the Invention

The present invention concerns composite structures, especially multilayer ceramic capacitors, having properties of high thermo-mechanical strength.

In the field of multilayer ceramic substrates as well as in that of multilayer ceramic capacitors or of any other multilayer structure of the same type, the properties of resistance to thermal shocks are always of critical importance. Thus, in the technology of surface-mounted components (SMC technology), which is coming into increasing use, the process of high-temperature wave soldering (namely for a temperature equal to or greater than 260° C.) imposes high thermo-mechanical stresses on the components to be soldered.

In the case of multilayer ceramic capacitors, there is no existing structure specifically adapted to the absorption of thermal shocks. Only the dimensions of the components are restrictive and enable the choice of the material or of the desired product to be directed as a function of its intended purpose. Depending on the formats of the components, one method or another will be used. Thus, for capacitors having formats of 0805 to 1210, it is possible to use flow soldering which imposes a high temperature gradient in the component. For capacitors having formats of 1812 to 2220 or more, reflow soldering must be used. This leads to a low temperature gradient in the component. For the latter formats, flow soldering would result in an excessive high reject rate. It will be recalled that the formats referred to are those of the international standards laid down by the EIA (Electronic International Association), and that the first two figures correspond to the length of the component in thousandths of an inch while the last two figures correspond to its width in thousands of an inch.

At present, in the field of multilayer SMC capacitors, there can be no question of mounting 2220-format components by a wave soldering process without a very high degree of pre-heating (the difference between the maximum temperature of the wave and the maximum temperature of the pre-heating is between 120° C. and 130° C.) which is designed to reduce the temperature gradient undergone by the component to below the temperature at fracture point.

In order to overcome the above-mentioned drawbacks, the present invention provides for the making, in a multilayer type composite structure, of zones with a particular distribution depending on the value of coefficient of thermal diffusivity of the materials used.

SUMMARY OF THE INVENTION

An object of the invention is a multilayer type composite structure that withstands shocks and is formed by an alternation of layers made of a first material and a second material, the first material having a higher coefficient of thermal diffusivity than the second material, wherein the distribution of the layers and their thickness are such that, in the thickness of the structure, there are zones formed by an alternation of layers of the first material and of the second material, these zones being separated from one another by a thick layer made of the second material.

Another object of the invention is a multilayer capacitor including dielectric layers separated by electrodes, wherein said multilayer capacitor is constituted according to the above-defined structure, the electrodes being made of the first material and the dielectric layers being made of the second material.

BRIEF DESCRIPTION OF THE DRAWINGS

The invention will be understood more clearly from the following description, given as a non-restrictive example and made with reference to the appended drawings, of which:

FIG. 1 shows a sectional view of a multilayer capacitor according to the prior art;

FIG. 2 shows a sectional view of a multilayer capacitor according to the invention;

FIG. 3 shows a variant of a multilayer capacitor according to the invention.

DESCRIPTION OF PREFERRED EMBODIMENTS

The elementary structure formed by a dielectric strip associated with a conductive strip can be likened to a simple bi-strip element characterized essentially by the properties of thermal diffusivity and expansion of the materials used.

In the case of a ceramic-metal bi-strip, the diffusivity of the metal (for example a metal electrode) is about 100 times that of the ceramic (for example a dielectric layer). This difference in diffusivity increases the deformation of this elementary bi-strip owing to the different expansion coefficients of the materials used, especially when the rise in temperature is high for a very short time (thermal shock). Consequently, when the thermal shock stress developed in the ceramic goes beyond the stress at fracture point, there is a fracturing of the composite structure.

According to the present invention, it has been observed and verified that if, in a multilayer type of composite structure, zones are created with a particular distribution of the layers forming the structure according to the value of the coefficient of thermal diffusivity of the materials used, then the components thus formed are far more resistant to thermal shocks. In particular, for multilayer type ceramic capacitors, if zones are created with a particular distribution of the volume of electrodes within the volume of ceramic, then it may be considered that, during a thermal shock, zones made solely of ceramic will exert counter-thrusts that will balance the forces exerted by combined metal/ceramic zones.

FIG. 1 shows a sectional view of a multilayer capacitor with ceramic dielectric according to the prior art. The section has been made in parallel to the electrical terminations of the capacitor. This figure shows an edgewise view of the odd-order electrodes 1 and even-order electrodes 2, buried in a mass of ceramic 3. In fact, the mass of ceramic is formed by layers alternating with the electrodes and evenly spaced out.

FIG. 2 shows a view, taken along the same section as earlier, of a multilayer capacitor according to the invention. The same references as in FIG. 1 are repeated for the same elements. In this case too, the even-order electrodes are connected to one another by the corresponding termination (not shown). This is the case also for the odd-order electrodes. As can be seen in FIGS. 1 and 2, the total volume occupied by the capacitor according to the invention is greater than for the prior art capacitor, owing to the creation of combined zones such as 4, separated from one another by a thick layer of ceramic 5. The increase in the thickness of the components according to the invention is a characteristic that runs counter to the very strong tendencies towards reducing the dimensions of SMC components. However, this increase in volume remains minimal (12% at the maximum for the biggest formats). In any case, it is smaller than what the figures suggest, and is of secondary importance as compared with the advantages obtained. These advantages are revealed by the tests enumerated below.

Capacitive components made of type II dielectric material, of the class X7R, which is the class of materials most sensitive to thermal shocks, have been made in the 2220 and 6360 formats (EIA standard) according to the prior art and according to the invention. The internal electrodes are made of palladium-silver alloy and the electrical terminations were made of palladium-silver or palladium-silver-platinum alloy. The test consists of a sudden immersion *without pre-heating* (the so-called extreme thermal shock test) in a tin-lead solder (60% of tin for 40% of lead, by weight) at 260° C. The electrical tests done before and after the thermal shock consist in measuring the rated capacity, the loss angle tgδ tgδ (tangent of the loss angle δ, also called dissipation factor) and the insulation resistance. A visual test with an enlargement of 50 and a three-point fracture test in deflection mode were also performed. All these tests made it practically sure that all cases of fracture would be identified. The results obtained are listed in table 1 placed at the end of the description.

The components Nos. 1 (0.33 μf) and 3 (4.7 μf) are prior art components, with respective formats of 2220 and 6360. The components Nos. 2 (0.3 μf, that is, 5% less capacity for the format) and 4 (4 μf, that is, 13% less capacity for the format) are components according to the invention, with respective formats of 2220 and 6360. The tests were conducted on three series of 400 components each time.

The table clearly shows all the value of the invention, especially for large-sized components.

It was also observed that the resistance to thermal shocks can be further improved by modulating the number of electrodes per combined zone such as 4 in FIG. 2. Thus, it is preferable for the zones of the center of the component to have few electrodes and for this number of electrodes per zone to increase in a direction going from the center of the component to its surface. This is what is shown in FIG. 3, where the same references as in FIG. 2 are repeated for the same elements.

Finally, in an additional improvement to the invention, it is seen to it that the dielectric layers have a thickness that gets smaller and smaller from the center of the structure towards the exterior.

The present invention can be applied particularly well, but not exclusively, to the case of multilayer capacitors. Thus, the invention can be applied to any multilayer structure associating dielectric layers and metal layers (for example, a ceramic substrate with a metal core setting up a heat sink). It can be applied also to the shields against electromagnetic pulses that are made in composite ceramic-metal structures. Generally speaking, the invention can be applied to any composite multilayer structure that is capable of undergoing thermal shock and is made of at least two materials having appreciably different coefficients of thermal diffusivity.

TABLE 1

| No | Thickness | Number of electrodes | % of fractures |
|---|---|---|---|
| 1 | 1.8 mm | 36 | 10% |
| 2 | 1.8 mm | 3 × 12 | 0% |
| 3 | 2.4 mm | 38 | 48% |
| 4 | 2.4 mm | 5 × 8 | 0% |

What is claimed is:

1. A multilayer type composite structure that withstands shocks and is formed by an alternation of layers made of a first material and a second material, the first material having a higher coefficient of thermal diffusivity than the second material, wherein the distribution of the layers and their thickness are such that, in the thickness of the structure, there are a plurality of zones formed by an alternation of several layers of the first material and of layers with all the same thickness of the second material, these zones being separated from one another by a thicker layer made of said second material.

2. A multilayer capacitor including dielectric layers separated by electrodes, wherein said multilayer capacitor is constituted by a structure according to claim 1, the electrodes being made. of the first material and the dielectric layers being made of the second material.

3. A multilayer type composite structure that withstands shocks and is formed by an alternation of layers made of a first material and a second material, the first material having a higher coefficient of thermal diffusivity than the second material, wherein the distribution of the layers and their thickness are such that, in the thickness of the structure, there are zones formed by an alternation of layers of the first material and of the second material, these zones being separated from one another by a thick layer made of the second material, wherein the thickness of said zones increases in a direction going from the center of the structure to its surface.

4. A composite structure according to claim 3, wherein the thickness of the layers of the second material decreases in a direction going from the center of the structure to its surface.

5. A multilayer capacitor including dielectric layers separated by electrodes, wherein said multilayer capacitor is constituted by a structure according to claim 3, the electrodes being made. of the first material and the dielectric layers being made of the second material.

6. A multilayer type composite structure that withstands shocks and is formed by an alternation of layers made of a first material and a second material, the first material having a higher coefficient of thermal diffusivity than the second material, wherein the distribution of the layers and their thickness are such that, in the thickness of the structure, there are zones formed by an alternation of layers of the first material and of the second material, these zones being separated from one another by a thick layer made of the second material, wherein the thickness of the layers of the second material decreases in a direction going from the center of the structure to its surface.

7. A multilayer capacitor including dielectric layers separated by electrodes, wherein said multilayer capacitor is constituted by a structure according to claim 6, the electrodes being made. of the first material and the dielectric layers being made of the second material.

* * * * *